Patented May 21, 1929.

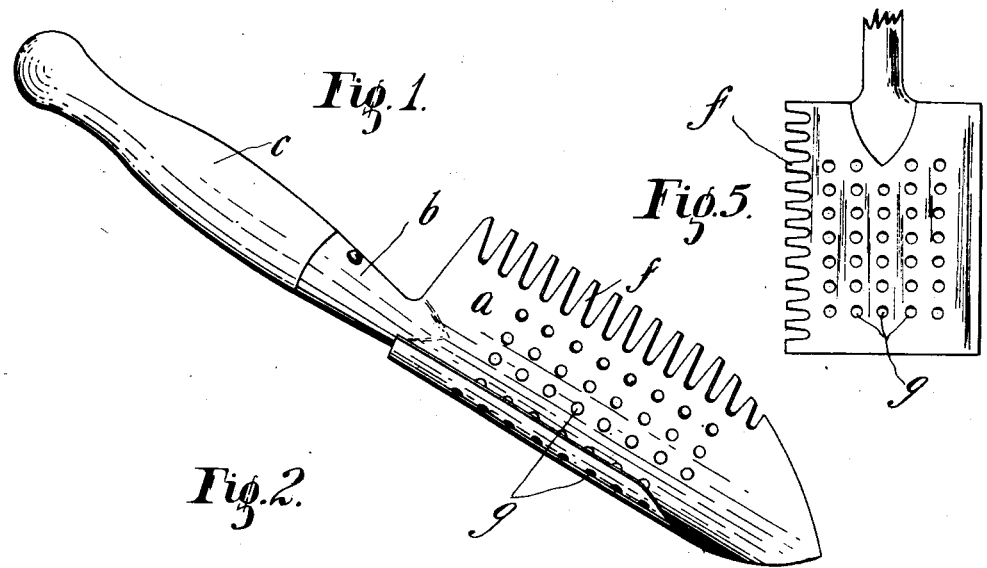
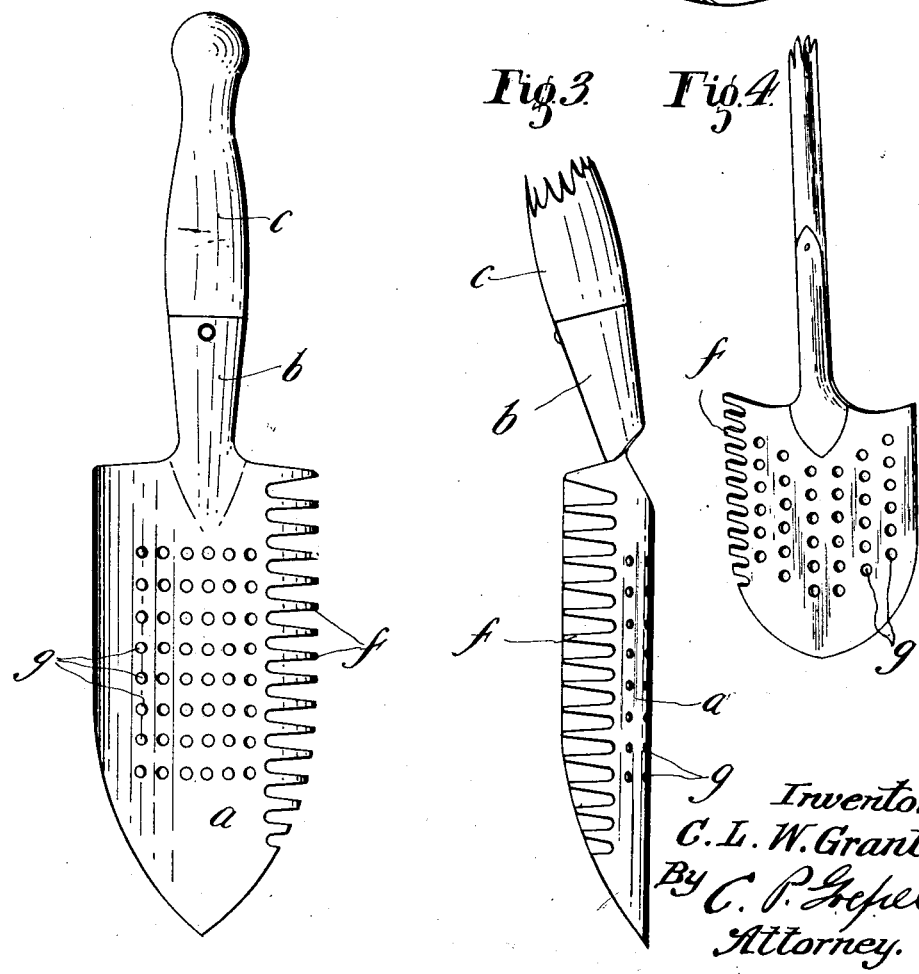

1,713,529

UNITED STATES PATENT OFFICE.

CAROLINE LILIAN WALES GRANT, OF EAST MALVERN, VICTORIA, AUSTRALIA.

GARDEN TROWEL.

Application filed September 23, 1926, Serial No. 137,203, and in Australia November 10, 1925.

This invention relates to an improved garden trowel and refers especially to trowels used by gardeners for light cultivation, the preparation of seed beds and for potting plants.

Though this invention is herein described as applicable for use as a garden trowel it will be understood that the term "trowel" is used in its broader sense as comprising a blade with a handle and not necessarily confined to that form of garden tool to which the term is usually applied and that the term "trowel" in this specification will include other similar garden tools to which the invention is applicable such as spades, shovels and the like.

The object of the invention is to provide a trowel of light and durable construction which whilst being adapted for ordinary gardening purposes can be effectively used for breaking up clods of earth, raking over seed beds and sieving the earth or other substances such as powdered or dry manure and for sprinkling the same evenly where required.

I accomplish the abovementioned object by providing a garden trowel comprising a blade attached to a handle, said blade having rake teeth formed on one or both of its sides and a series of perforations in the blade or body portion thereof. In practice the blade is preferably concave or curved in cross section as is usual with hand garden trowels.

In order that the invention, the object and nature of which have been set forth, may be readily understood reference will now be had to the accompanying sheet of explanatory drawings wherein Figure 1 is a view in perspective of a garden trowel constructed in accordance with the invention.

Figure 2 is a view in front elevation, and

Figure 3 is a view in side elevation of the trowel.

Figure 4 is a view in perspective of a shovel constructed in accordance with the invention, and Figure 5 is a view in front elevation of portion of a spade.

In these drawings the letter $a$ designates the blade of the trowel which is of concave formation and provided at one end with a socket $b$ adapted to receive a handle $c$.

The socket is set at an angle to the blade in the usual way and the handle is retained therein by means of a nail or like member. The digging end of the trowel may be given a curved formation as illustrated or it may be made square as preferred.

One edge of the blade is formed with a plurality of rake teeth $f$ which extend the full length thereof and the central portion of the blade has a series of perforations $g$ formed therein.

If desired either or both sides of the blade can be provided with rake teeth and the perforations therein may be round, square or of any other approved shape.

The blade and socket can be stamped out of sheet metal or cast in the form illustrated, or alternatively, the blade and socket can be formed separately and connected together by rivets or in any other well known way.

The socket can be adapted to take a short handle as shown in the drawings or a long handle can be provided to enable a person to stand erect when using the same, that is, as a spade.

In lieu of giving the blade a concave formation it may be made flat with upwardly turned sides in which case the rake teeth are formed by shaping one or both of the upturned side portions of the blade.

It will be readily understood that the blade of the trowel can be made flat or curved with the rake teeth only or with the perforations only in the blade and in the former case the implement can be used conveniently for preparing the surfaces of seed beds and in the latter case the blade of the implement can be used for satisfactorily sieving soil or other material.

The rake teeth on the side of the blade of the trowel can be used for pulverizing or breaking up clods of earth or loam when preparing a bed for small seeds or earth for pot plants and the perforated blade can be used as a sieve for separating hard lumps of earth and coarse particles from the soil being treated. Moreover, the rake can be employed to level the soil in preparing it for sowing seeds and the perforated blade provides a convenient form of sieve for sprinkling fine loam or other powdered or dry substances over the bed after the seeds have been sown.

It will be obvious that the invention may be adapted to spades, shovels and similar digging tools of larger dimensions than the ordinary hand trowel and having a flat or curved blade or a blade with upturned sides.

I claim:

1. An article of manufacture having a blade and means for attaching a handle thereto, elongated rake teeth along the side of the blade, and a number of perforations in the blade for sieving.

2. A garden trowel comprising a blade, a handle attached thereto, the blade having teeth along at least one side formed by deep indentations in said side, the outline of said blade extending along the outer ends of the teeth and enclosing a figure which is symmetrical with respect to an axis passing lengthwise through the handle and said blade.

In witness whereof I hereunto affix my signature.

CAROLINE L. W. GRANT.